US009493658B2

(12) United States Patent
Martin et al.

(10) Patent No.: US 9,493,658 B2
(45) Date of Patent: Nov. 15, 2016

(54) METHOD AND APPARATUS FOR THE PREPARATION OF CALCIUM CARBONATE COATED CALCIUM HYDROXIDE PARTICLES

(71) Applicant: 2262554 Ontario Inc., Parry Sound (CA)

(72) Inventors: Marcus E. Martin, Parry Sound (CA); Edward K. Pardiak, Cote-Saint-Luc (CA)

(73) Assignee: Biosenta Inc., Toronto, Ontario (CA)

(*) Notice: Subject to any disclaimer, the term of this patent is extended or adjusted under 35 U.S.C. 154(b) by 0 days.

(21) Appl. No.: 14/351,598

(22) PCT Filed: Oct. 12, 2012

(86) PCT No.: PCT/CA2012/050722
§ 371 (c)(1),
(2) Date: Apr. 14, 2014

(87) PCT Pub. No.: WO2013/053064
PCT Pub. Date: Apr. 18, 2013

(65) Prior Publication Data
US 2014/0326167 A1  Nov. 6, 2014

Related U.S. Application Data

(60) Provisional application No. 61/546,675, filed on Oct. 13, 2011.

(51) Int. Cl.
| *C09C 1/02* | (2006.01) |
| *B05C 3/00* | (2006.01) |
| *B05D 1/30* | (2006.01) |
| *C08K 9/10* | (2006.01) |
| *C01F 11/02* | (2006.01) |
| *C01F 11/18* | (2006.01) |

(52) U.S. Cl.
CPC ............... *C09C 1/024* (2013.01); *B05C 3/00* (2013.01); *B05D 1/30* (2013.01); *C01F 11/02* (2013.01); *C01F 11/181* (2013.01); *C08K 9/10* (2013.01); *C09C 1/021* (2013.01); *C01P 2004/32* (2013.01); *C01P 2004/51* (2013.01); *C01P 2004/61* (2013.01); *C01P 2004/80* (2013.01); *C01P 2004/84* (2013.01)

(58) Field of Classification Search
CPC ......... C09C 1/021; C09C 1/024; C08K 9/10; B05D 1/30; C01F 11/181; C01F 11/02; C01P 2004/32; C01P 2004/51; C01P 2004/61; C01P 2004/80; C01P 2004/84

USPC .................. 106/461, 464; 118/712; 427/215; 428/403
See application file for complete search history.

(56) References Cited

U.S. PATENT DOCUMENTS

| 3,855,125 | A | 12/1974 | Lin |
| 4,061,593 | A | 12/1977 | Summers |
| 4,387,078 | A | 6/1983 | Lin |
| 5,494,651 | A | 2/1996 | Minayoshi et al. |
| 5,690,729 | A | 11/1997 | Jones, Jr. |
| 5,910,214 | A * | 6/1999 | You .............................. 106/465 |
| 5,997,833 | A * | 12/1999 | Bunger et al. ................. 423/309 |
| 6,294,143 | B1 * | 9/2001 | Deutsch et al. ............... 423/432 |
| 6,310,129 | B1 | 10/2001 | Lilly et al. |
| 6,458,335 | B1 | 10/2002 | Lemaitre et al. |
| 6,475,459 | B1 | 11/2002 | Virtanen |
| 6,500,400 | B1 * | 12/2002 | Kinnen et al. ................. 423/432 |
| 7,754,176 | B2 * | 7/2010 | Makino et al. ................ 423/430 |
| 7,883,681 | B2 | 2/2011 | Meade |
| 8,012,445 | B2 | 9/2011 | Maijala et al. |
| 2004/0225050 | A1 | 11/2004 | Meade |
| 2010/0024686 | A1 | 2/2010 | Constantz et al. |
| 2011/0105671 | A1 | 5/2011 | Meade |

FOREIGN PATENT DOCUMENTS

| CA | 2213086 | 4/1999 | |
| CA | 2296609 | 3/2003 | |
| CA | 2572776 | 10/2013 | |
| EP | 0459399 A1 | 12/1991 | |
| JP | 3-14696 A * | 1/1991 | .............. C01F 11/18 |
| JP | 2002-233851 A * | 8/2002 | .............. B09B 3/00 |
| WO | 2006005793 A1 | 1/2006 | |

OTHER PUBLICATIONS

Supplementary European Search Report for EP 12 84 0442 dated Jan. 21, 2015.
International Search Report for PCT/CA2012/050722 dated Feb. 5, 2013.

* cited by examiner

*Primary Examiner* — Anthony J Green
(74) *Attorney, Agent, or Firm* — Fasken Martineau DuMoulin LLP

(57) ABSTRACT

The present invention relates to a method of preparing calcium carbonate coated calcium hydroxide particles by combining calcium hydroxide and dry ice in an acquiescent manner. The invention further relates to an apparatus for carrying out the method and to the use of the calcium carbonate coated calcium hydroxide particles of the method as filler for use with thermoplastics polymers.

22 Claims, 4 Drawing Sheets

METHOD AND APPARATUS FOR THE PREPARATION OF CALCIUM CARBONATE COATED CALCIUM HYDROXIDE PARTICLES

CROSS REFERENCE TO RELATED APPLICATION

This application claims the benefit of U.S. Provisional Application No. 61/546,675 filed Oct. 13, 2011, the entire contents of which are incorporated by reference.

FIELD OF THE INVENTION

The present invention relates to a method for preparing calcium carbonate coated calcium hydroxide particles using calcium hydroxide and carbon dioxide as starting materials. More specifically, the invention relates to the use of dry ice as the source of carbon dioxide in the method for preparing calcium carbonate coated calcium hydroxide particles. The application further relates to an apparatus for carrying out the method, and to compositions comprising calcium carbonate coated calcium hydroxide particles.

BACKGROUND OF THE INVENTION

In the production of acetylene gas, one of the waste by-products is "carbide lime". Canadian Patent Nos. 2,213,086 and 2,296,609, and U.S. Pat. No. 6,310,129 ("the '129 patent"), which are hereby incorporated herein by reference, each describe a method for converting raw "carbide lime" waste material into a composition usable as a filler in thermoplastic resin materials. All three patents contain essentially the same disclosure, and the '129 patent will typically be referred to hereinafter, and is representative of all three. As described in the '129 patent, the method comprises screening the raw carbide lime for size reduction, drying the screened carbide lime to obtain a low moisture content and a calcium carbonate content below 25 percent, fine grinding the dried material, and classifying the fine ground particles to separate a fraction of the particulates having a desired particle size, and corresponding lower specific gravity. As described in the '129 patent, this method results in a processed carbide lime composition which comprises 70 to 85 percent by weight calcium hydroxide and 5 to 25 percent by weight calcium carbonate, wherein the calcium carbonate is in the form of surface carbonation on the calcium hydroxide.

Since the advent of the processed carbide lime filler composition described in the '129 patent, certain benefits and drawbacks of the processed carbide lime composition have been discovered. One very significant beneficial quality discovered is that when the processed carbide lime composition is used as a filler and mixed with a resin to produce resin molded products, the composition imparts sterilizing properties to the molded product. It is known that calcium hydroxide, a main constituent of the carbide lime filler composition, has antibacterial, anti-viral, and anti-fungal properties which can last up to a hundred years. Resin molded products made using the processed carbide lime filler compositions apparently benefit from the calcium hydroxide content and are essentially sterilized. This characteristic makes resin molded products made with the processed carbide lime compositions especially useful in applications where sterilization is important.

Another benefit imparted to polyvinyl chloride (PVC) resin molded products made with the processed carbide lime filler composition is the ability of calcium hydroxide to neutralize toxic gases from PVC combustion. Calcium hydroxide reacts favourably with toxic chloride gas produced by PVC combustion, resulting in two harmless substances, i.e., water and salt. A complementary quality is that the carbide lime filler composition is also flame retardant due to its high melting point, and exhibits a "hard char" effect after burning. Consequently, coating for electrical wiring, for example, which is made from a resin containing the processed carbide lime filler composition, will not simply decompose when subjected to fire. Instead, the coating will form a hard coating on the wire, thus potentially preventing further hazard.

As explained in the '129 patent, commercial "synthetic" calcium hydroxide has been used, or the use thereof has been investigated, as fillers in resin molding systems. Some limitations and shortcomings of the use of calcium hydroxide as a filler are also described in that patent. The use of calcium carbonate as a filler material in resin molding systems is also known. There are numerous processes known for producing calcium carbonate, as described in, for example, U.S. Pat. Nos. 6,458,335 and 6,475,459 ("the '459 patent") which are hereby incorporated by reference. The '459 patent, for example, describes a process for producing precipitated calcium carbonate, and explains that the use of precipitated calcium carbonate is growing in various industries, such as paper, plastic, and pharmaceutical industries. The process for preparing calcium carbonate particles described in the '459 patent comprises reacting a starting material containing calcium oxide with carbonate ions in the presence of water to produce calcium carbonate, and recovering the calcium carbonate, characterized in that the formation is carried out directly from calcium oxide to calcium carbonate without intermediate stages. Additionally, the process is carried out under intensive agitation such that the calcium carbonate becomes detached from the surface of the calcium hydroxide. Other methods known in the art for the manufacture of particles of calcium carbonate are described in numerous patent applications listed in the '459 patent.

Calcium carbonate does not exhibit, and does not impart, the aforementioned anti-microbial or flame retardant properties to resin molded products. Unmodified calcium hydroxide without the calcium carbonate surface coating has not been found to be as useful as the coated calcium hydroxide for application as a filler for resin molded products. This is apparently due to the surface carbonation providing a protective coating on the calcium hydroxide particles which permits the particles to be incorporated into the resin matrix in a manner in which unmodified calcium hydroxide cannot.

U.S. Pat. No. 7,883,681 ("the '681 patent") which is hereby incorporated by reference, discloses the use of calcium carbonate coated calcium hydroxide particles as a filler material in polyvinylchloride (pvc) resin molded products. These particles were found to combine the advantage of the calcium carbonate of being readily incorporated in PVC resin while retaining the advantageous properties of calcium hydroxide including the antimicrobial and flame retardant properties. In particular the '681 patent discloses a method of making calcium carbonate coated calcium hydroxide particles comprising 70-80% by weight of calcium hydroxide and about 5-25% by weight of calcium carbonate in the form of a coating on the surface of the calcium hydroxide particles.

The '681 patent teaches a method of making the carbonate coated calcium hydroxide particles comprising suspending the calcium hydroxide particles in the air; carbonating said suspended particles by exposure to carbon dioxide; and carrying out the carbonation reaction for a predetermined period of time to create a surface carbonation on the calcium hydroxide in the proportions described above. The '681 patent describes using a gas, such as air, containing carbon dioxide as the carbon dioxide source, and further describes blowing the gas into a vessel containing the suspended calcium hydroxide particles, to create the surface carbonation on the suspended particles. This is an impinging process. Accordingly, the amount of carbon dioxide is controlled by the length of time of exposure to the gas containing carbon dioxide. In a particular embodiment, the '681 patent teaches the use of the exhaust gas of calcining ovens which contains carbon dioxide as a by product of the processes used to obtain the calcium oxide particles that are then hydrated to produce the calcium hydroxide particles.

One issue associated with the method of the '681 patent is that there is limited control over the amount of carbon dioxide exposure of the calcium hydroxide particles. As a result it may be difficult to control in an accurate manner, the amount of surface carbonation of the calcium hydroxide particles this may result in poor reproducibility and inconsistent product particles.

A further issue associated with the method described in the '681 patent is that suspending the calcium hydroxide particles in air requires a high velocity and turbulent conditions in the system. In such a system the calcium hydroxide particles will collide with one another resulting in particles of uneven shape and size. Furthermore, the flow of the carbon dioxide across the suspended particles may results in an uneven coating of calcium carbonate on the surface giving a "comet-like" shape to the coated particles having a rounded side at one face and a tail at the opposite face. Furthermore, the reaction described in the '681 patent occurs in turbulent air streams at high pressure, with carbon dioxide gas impingement causing particle size reduction due to attrition milling. In this method the aspect ratio of the particles is reduced and shear of individual particles may uncover more calcium hydroxide surface which may be detrimental to incorporation into resins.

Furthermore, the use of the by-product gas of the calcining process as described in the '681 patent may be difficult to control, as the exact amount of carbon dioxide in the by-product gas is not known. Furthermore, this method ties the processes together such that they must be done in tandem and in close proximity which may be limiting depending on the source of materials.

SUMMARY OF THE INVENTION

In one aspect of the present invention there is provided a method of preparing calcium carbonate ($CaCO_3$) coated calcium hydroxide ($Ca(OH)_2$) particles comprising:
introducing calcium hydroxide particles into a reaction vessel;
reacting the calcium hydroxide particles with carbon dioxide in the form of dry ice by introducing the dry ice into the reaction vessel and allowing the carbon dioxide to co-mingle with the calcium hydroxide particles and react to form a calcium carbonate coating on the calcium hydroxide particle;
wherein the proportion of the calcium hydroxide particles to dry ice is controlled to provide calcium carbonate coated calcium hydroxide particles comprising about 70-80% w/w calcium hydroxide and about 5-30% w/w calcium carbonate surface coating.

In an embodiment of the invention the co-mingling of the calcium hydroxide particles with the carbon dioxide is by gravity settling of the particles.

In an embodiment of the invention the calcium hydroxide particles are about 44 micron. In a further embodiment the calcium hydroxide particles are in the form of a powder. In another embodiment of the invention the calcium hydroxide particles have a size distribution consisting of 95% population of 44 micron particles.

In a further embodiment the proportion of the dry ice to calcium hydroxide is 70 lb of dry ice per ton of calcium hydroxide.

In a further aspect of the invention there is a provided an apparatus for preparing calcium carbonate coated calcium hydroxide particles comprising:
a reactor;
an inlet for calcium hydroxide particles;
an inlet for dry ice;
a density meter for determining the specific gravity of the reaction product,
wherein the specific gravity of the reaction product provides an indication of the percentage of surface carbonation formed by the reaction of the dry ice and calcium hydroxide; and
whereby the amount of dry ice introduced into the system can be increased or decreased to provide a product having a selected specific gravity and percentage of surface carbonation.

In a further aspect of the invention there is provided a composition comprising carbonated coated calcium hydroxide particles prepared by introducing calcium hydroxide particles into a reaction vessel;
reacting the calcium hydroxide particles with carbon dioxide in the form of dry ice by introducing the dry ice into the reaction vessel and allowing the carbon dioxide to co-mingle with the calcium hydroxide particles and react to form a calcium carbonate coating on the calcium hydroxide particle;
wherein the proportion of the calcium hydroxide particles to dry ice is controlled to provide calcium carbonate coated calcium hydroxide particles comprising about 70-80% w/w calcium hydroxide and about 5-30% w/w calcium carbonate surface coating.

In a further aspect of the invention there is provided a composition as described above for use as a filler with a polymer. In a particular aspect the polymer is a thermoplastic or a thermoset polymer.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
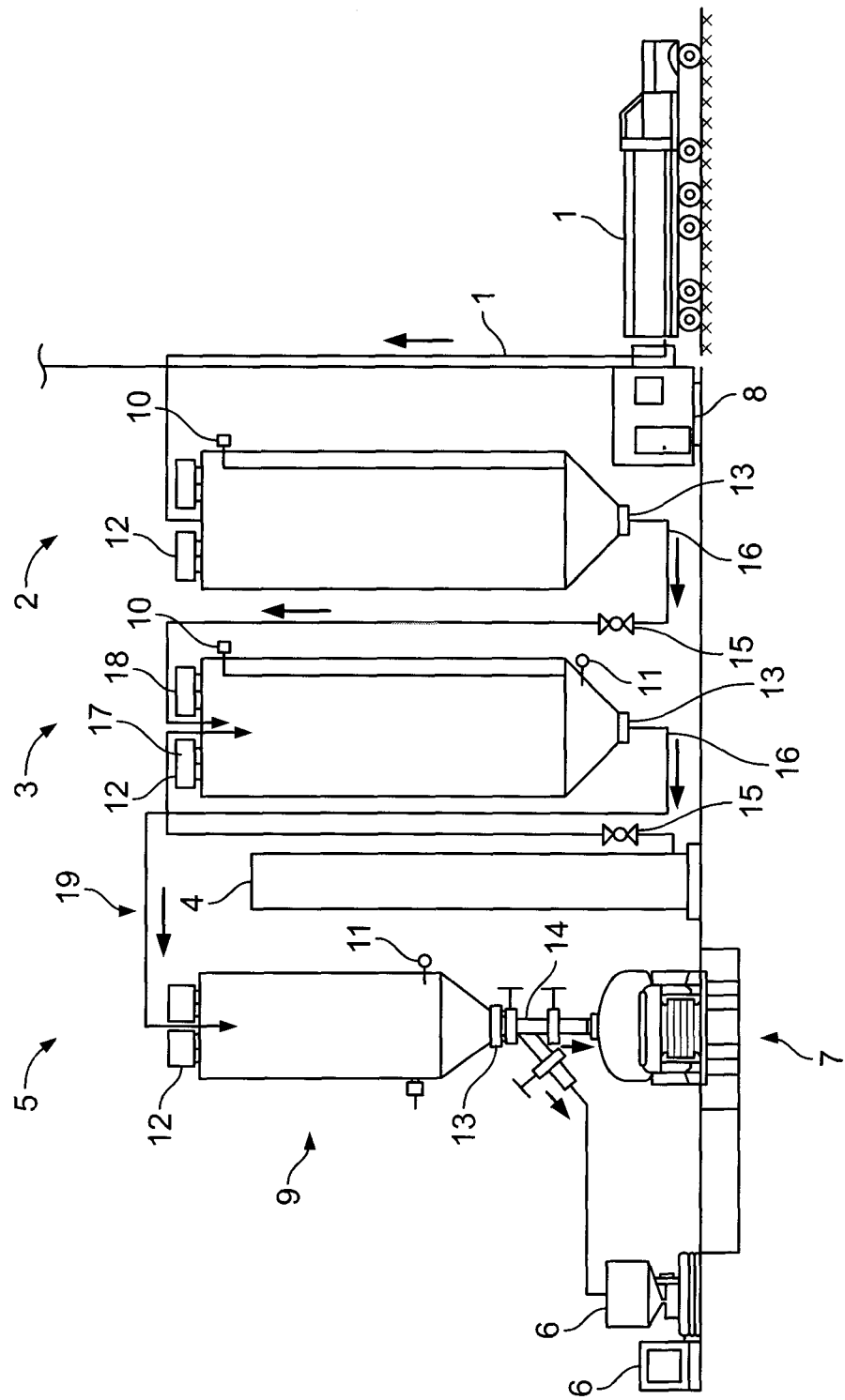
FIG. 1 is a depiction of a reactor system for the reaction of $Ca(OH)_2$ and dry ice ($CO_2$) to provide calcium carbonate coated calcium hydroxide particles.
Figure 2A:
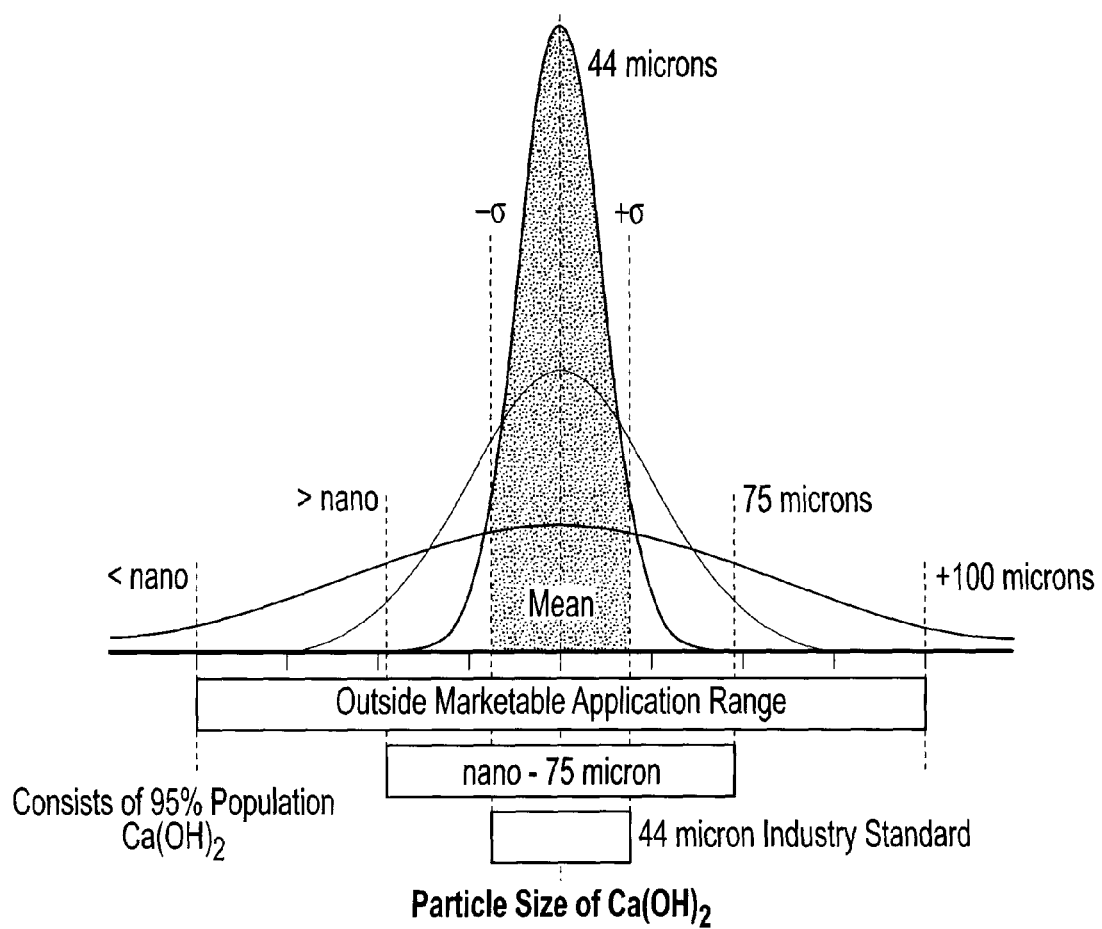
FIG. 2a is a graph indicating the mean particle size of the $Ca(OH)_2$ particles
Figure 2B:
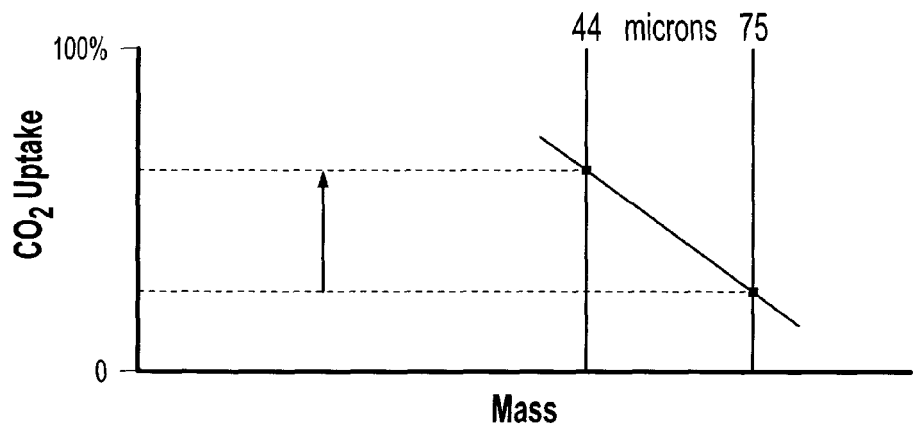
FIG. 2b is a graph indicating the percentage of conversion by volume of the $Ca(OH)_2$ to $CaCO_3$ relative to the mass of the calcium hydroxide particles.
Figure 3A:
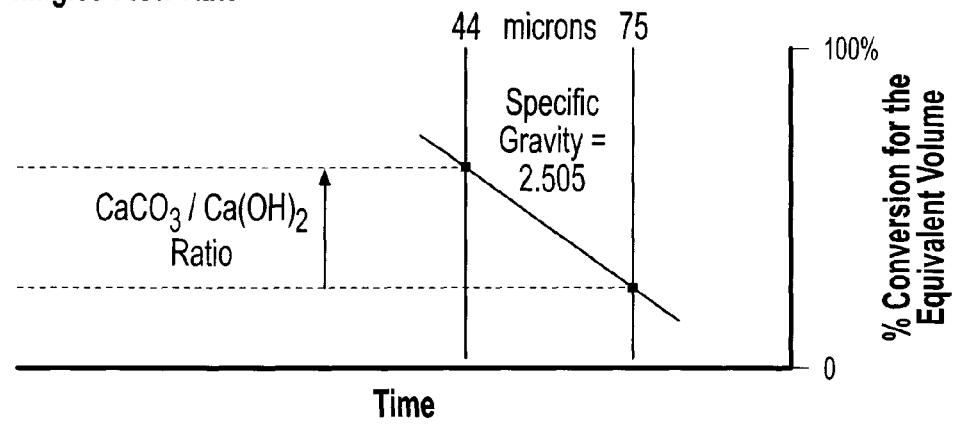
FIG. 3a is a graph indicating the percentage of conversion by volume of the $Ca(OH)_2$ to $CaCO_3$ relative to time.
Figure 3B:
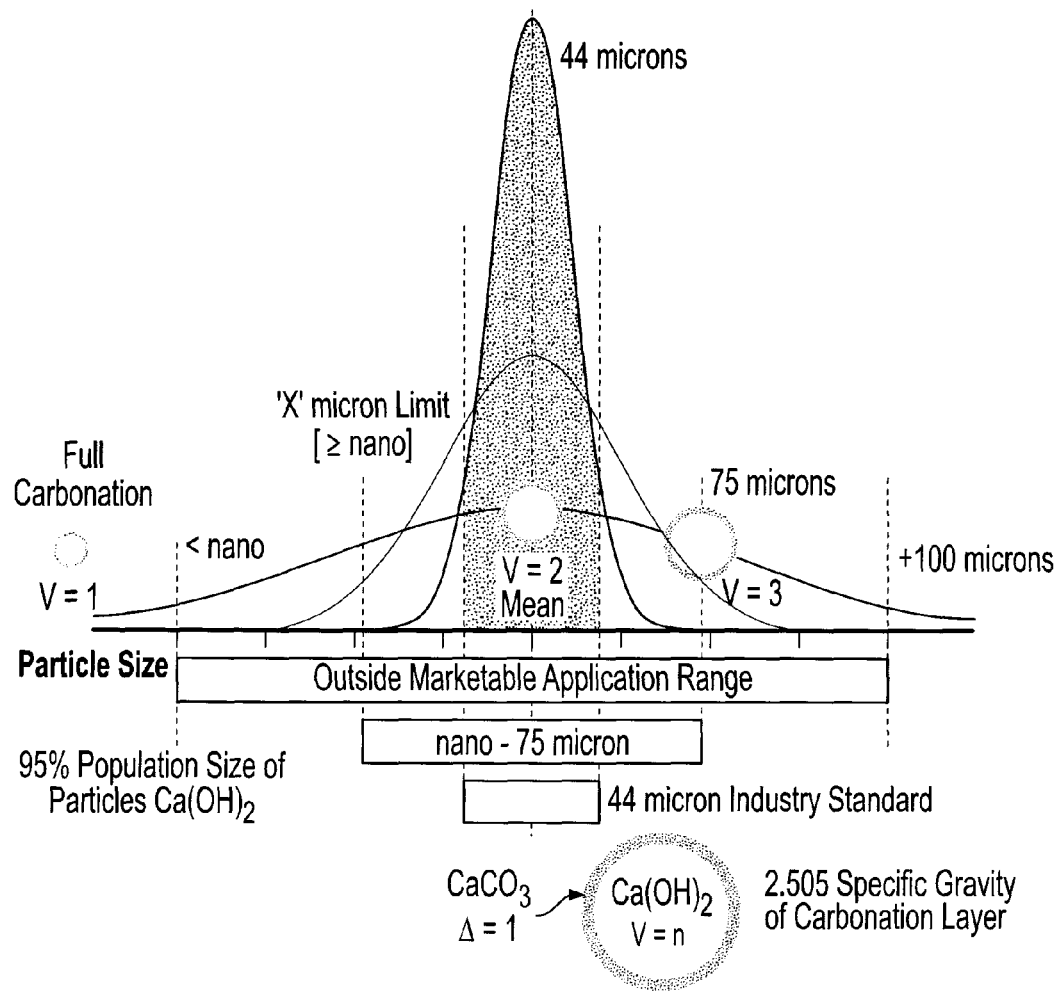
FIG. 3b is a graph indicating the conversion of $Ca(OH)_2$ to $CaCO_3$ relative to particle size.

Embodiments of the invention will now be described with reference to the figures.

As used herein the term "dry ice" refers to carbon dioxide ($CO_2$) in the solid from which sublimes to produce carbon dioxide gas at room temperature.

The terms "calcium hydroxide" and "$Ca(OH)_2$" are used interchangeably herein. Similarly, the terms "calcium carbonate" and "$CaCO_3$" are used interchangeably herein.

The terms "surface coating" and "coating" as used herein refer to a layer of one material substantially covering the surface of a particle of another material.

In an embodiment of the invention calcium hydroxide particles are combined with dry ice ($CO_2$) to provide calcium carbonate ($CaCO_3$) coated calcium hydroxide ($Ca(OH)_2$) particles. The dry ice is added in a measured ratio to calcium hydroxide in order to provide a final particle comprising 70-80% w/w calcium hydroxide (core) and 5-30% w/w calcium carbonate surface coating on the core. In a further aspect of the invention the particle comprises 70-95% w/w calcium hydroxide, and in a further embodiment 70-85% w/w calcium hydroxide. In a further aspect of the invention the calcium carbonate coating is 15-30% w/w. In still a further embodiment the calcium carbonate coating is 20% w/w.

In an embodiment of the invention the particle size of the calcium hydroxide particles is approximately 44 micron. In a further embodiment the particles size is less than 100 microns, in a further embodiment the particle size is less than 75 microns. In a further embodiment the mean particle size is 44 microns and the size distribution of the particles consists of 95% population of 44 micron particle as per the industry standard. In another embodiment the particle size may be expressed as a mesh size. In a particular embodiment the particle size is minus 600 mesh in a further embodiment the particle size is minus 325 mesh.

It has been found that to obtain a surface coating of 20% by weight of calcium carbonate on $Ca(OH)_2$ particles of 44 microns, 70 lbs of dry ice per ton of $Ca(OH)_2$ is required.

In a particular embodiment the particle size of the calcium hydroxide particles is 44 micron. In an embodiment of the invention 1 cubic foot (cu ft) of $Ca(OH)_2$ in the form of 44 micron dry powder was found to have a weight of 40 pounds (lbs). One pound of dry ice is equal to 8.75 Cu Ft of $CO_2$ gas at 1 atmosphere and 70° F. Accordingly, for 20% surface conversion of $Ca(OH)_2$ to $CaCO_3$, 70 lb of dry ice per ton of $Ca(OH)_2$ is required.

The ratio of calcium hydroxide to carbon dioxide can be varied to provide particles having a different percentage of carbonation. The ratio of the components is based on particle size and weight per dry standard cubic foot compacted per ASTM standards for bulk density of powdered materials. Sublimed carbon dioxide gas produces the carbonate coating on the calcium hydroxide particle surfaces.

In a further aspect of the invention the calcium hydroxide particles and dry ice particles may be added simultaneously to a reaction vessel and allowed to mix by gravity settling. No further agitation of the calcium hydroxide particles is required, although some agitation or mixing of the reagents is permitted. The dry ice sublimes at room temperature to envelope the calcium hydroxide particles this provides an even coating of calcium carbonate on the calcium hydroxide particles. The minimal agitation of the calcium hydroxide allows for retention of the shape and size of particle as initially added to the reaction. Minimizing the agitation of the starting material also reduces the potential for changes in morphology and impact damage to surface carbonation and early release or exposure of the core calcium hydroxide material.

In a particular embodiment the calcium hydroxide starting material will contain particles having a narrow size distribution and having a spherical shape. Accordingly, the product calcium carbonate coated calcium hydroxide particles produced by this method will also have a spherical shape and narrow size distribution. It has been found that small particles of dry ice are most effective in providing an even layer of carbonation. In a particular embodiment the dry ice is in the form of small flakes or particles. For example, the dry ice particles will have a size of about 0.425 mm.

Furthermore, it has been found that the use of dry ice as the source of carbon dioxide combined with the calcium hydroxide in an acquiescent and non-turbulent manner provides a more consistent thickness of calcium carbonate coating around the circumference of the particle minimizing the "comet like" affect that results from blowing carbon dioxide gas over the particles. Furthermore, the minimal agitation required for the mixing of the reagents in this reaction provides a more consistent thickness of coating from one particle to the next. It has also been found that the use of dry ice as the source of carbon dioxide provides a smoother and more consistent product particle shape. This is believed to be due to the fact that the reaction rate can be more readily controlled and the vigorous agitation causing collisions of the particle is avoided.

In a further aspect of the invention the reaction of calcium hydroxide may be carried out as a batch reaction or as a continuous flow reaction.

In a further aspect of the invention there is provided an apparatus for carrying out the method described above. In an embodiment of the invention. The calcium hydroxide particles are combined with dry ice in a reaction vessel such as a silo reactor having an inlet for dry ice ($CO_2$) and an inlet for $Ca(OH)_2$. The inlet used for the dry ice may be the same or different than the inlet used for $Ca(OH)_2$. In an embodiment of the invention the $Ca(OH)_2$ and dry ice will be added to the reaction vessel at the same time either through the same or different inlets and will be allowed to mix via down draft gravity settling. In a further embodiment the inlets may be inlet manifolds. The silo reactor may be further provided with an outlet for removal of the reaction product, the calcium carbonate coated calcium hydroxide particles.

FIG. 1 depicts a particular embodiment of the apparatus. FIG. 1 shows a bulk transport delivery (1) for delivering calcium hydroxide particles. A storage silo (2) for storing calcium hydroxide particles and a means for transferring the calcium hydroxide from the transport delivery vehicle to the storage silo, for example, by pneumatic unloading. There is further provided a means for transferring the calcium hydroxide from the storage silo (2) to a reaction silo (3), for example, by aero mechanical conveyor. The reaction silo (3) also has an inlet for carbon dioxide (17), an inlet for calcium hydroxide (18) and an outlet (19) for removing the reaction product. There is further provided a means for transporting the product to the delivery product silo (5). The reaction silo (3) may further have one or more level indicators (10). The reaction silo (3) may also have air filters and/or temperature indicators (12). The reaction silo (3) may further have vibration bin dischargers (13). The discharged reaction product can be moved to delivery product silo (5) which may also have air filters and/or temperature indicators (12).

FIG. 1 also shows a carbon dioxide tank (4) containing liquid carbon dioxide for dry ice plant. The dry ice plant comprises carbon dioxide liquid stored at high pressure and means for converting the liquid carbon dioxide to dry ice, for example, by flow of the liquid carbon dioxide through an injector or sparger mechanism into the reaction silo (3) at reduced pressure.

The delivery product silo (5) of FIG. 1 further has one or more density gauges (9) and a temperature gauge (11). The delivery product silo (5) may also have vibration bin dischargers (13). As shown in FIG. 1 the delivery product silo may have a two way valved product spool bypass, for directing the product to either a bulk transport vehicle (7) or a product bagging line (6). FIG. 1 also shows flow control valves (15) for controlling the flow of the calcium hydroxide and carbon dioxide into the reaction silo (3).

FIG. 1 further shows the process controls (8) for controlling the flow valves and monitoring the gauges and indicators. The process controls may be manual or may be automated.

In a further aspect the apparatus may comprise a density meter that is used to determine the specific gravity of the particles in the reaction mixture. In a particular embodiment the commercially available Thermo Scientific nuclear density meter is used. It would be under stood by a person of skill in the art that other density meters could be used.

The specific gravity of the starting material calcium hydroxide can be measured and the difference between the specific gravity of the starting material and the product can be determined or estimated. Based on the specific gravity of the particles in the reaction mixture the progress or degree of completion of the reaction can be monitored. The reaction conditions may be adjusted for example by adding more dry ice in order to achieve the desired degree of reaction.

Adjustment of the reaction conditions may be controlled and optimized manually by an operator observing the density measurements and adjusting the process reaction parameters or may be controlled and optimized by a computer that has been programmed to adjust various reaction parameters on the basis of the density measurements. In a further aspect of the invention the computer is a programmable logic controller.

It will be further understood that various other meters may be added to the reaction vessel to measure reaction conditions such as moisture or humidity levels, temperature, pressure and the like. These measurements may be used to adjust the reaction conditions such as time, temperature, and/or the proportion of reagents. These processes variables may be monitored and adjusted to achieve consistent quality control of the final product carbonate coated calcium hydroxide particles.

An embodiment of the invention will now be described by way of a specific example.

Example 1

Reaction of Calcium Hydroxide with Dry Ice in a Hobart™ Mixer

Calcium hydroxide particles of 75 microns or minus 200 mesh were added to a Hobart™ flour mixer with dry ice that was previously crushed to reduce the size of the particles. The dry ice particles having a size range of approximately minus 12 mesh to plus 18 mesh size. The calcium hydroxide and carbon dioxide were allowed to react to produce a carbonate coating on the calcium hydroxide particles.

Table 1 indicates the weight of calcium hydroxide starting material as "weight in" and the weight of the product as "weight out" for a series of reactions 1-8. The change in weight from starting material to product is indicated as well as the percentage difference. The average weight difference from starting material calcium hydroxide to product across all the reactions was 2.08%. The calcium hydroxide starting material was supplied by Sylvette in Putnam (Cameuse) having a moisture content less than 2.5%. The reactions were split into multiple batches due to the size of the reactions vessel. The batches are indicated in Table 2 below, for example reaction 2 was carried out in two batches 2a and 2b.

TABLE 1

| Reaction Number | Weight in (Kg) | Weight out (kg) | Weight Difference (kg) | Gain or Loss in percent (%) | Weight Cross check |
|---|---|---|---|---|---|
| 1 | 9.517 | 9.83 | 0.313 | +2.28 | 9.83 |
| 2 | 9.682 | 9.9 | 0.218 | +2.252 | 9.9 |
| 3 | 9.448 | 9.56 | 0.112 | +1.12 | 9.56 |
| 4 | 8.935 | 9.12 | 0.185 | +2.0 | 9.14 |
| 5 | 8.924 | 9.21 | 0.286 | +3.0 | 9.14 |
| 6 | 10.036 | 10.24 | 0.204 | +2.0 | 10.24 |
| 7 | 8.92 | 9.12 | 0.20 | +2.0 | 9.12 |
| 8 | 8.91 | 9.12 | 0.20 | +2 | 9.12 |

Table 2 indicates the weight of $Ca(OH)_2$ and the weight of dry ice used in the each batch of each reaction.

TABLE 2

| Reaction number | $Ca(OH)_2$ weight (kg) | Dry Ice weight in (kg) |
|---|---|---|
| 2a | 4.5 | .92 |
| 2b | 3.8 | .76 |
| 3a | 4.5 | 0.92 |
| 3b | 3.6 | 0.7 |
| 4a | 4.5 | 0.92 |
| 4b | 3.3 | 0.66 |
| 5a | 4.8 | 0.96 |
| 5b | 3.0 | 0.90 |
| 6a | 4.5 | 0.92 |
| 6b | 5.36 | 1.107 |
| 7a | 4.5 | 0.9 |
| 7b | 3.3 | 0.66 |
| 8a | 4.5 | 0.90 |
| 8b | 3.3 | 0.66 |

It has been found that the 44 micron calcium hydroxide is approximately 40 lbs per cu ft. Based on the average weight increase of 2.08% measured for the reactions listed above, the average weight per cu ft of the product would be 40.832 lbs per cu ft.

(2.08/100)×40=0.832 lbs of gain per cu ft.

If the bulk density of $CaCO_3$ is 44 lbs per cu ft. at specific gravity of 2.7 then surface treated $Ca(OH)_2$ at a bulk density of 40.832 lbs per cu ft is 2.505 specific gravity.

(2.7/44)×40.832=2.505 specific gravity.

This calculation confirms that the calcium carbonate coating has been converted in approximately the desired proportion to the calcium hydroxide.

In a further aspect of the invention there is provided a composition comprising calcium carbonate coated calcium hydroxide particles prepared by the method described above as a filler with a thermoplastic or thermoset material.

In an embodiment of the invention the thermoplastic or thermoset material is one or more of a thermoplastic or thermoset polymer, a thermoplastic or thermoset elastomer and a thermoplastic or thermoset rubber.

In a further embodiment of the invention the composition comprising calcium carbonate coated calcium hydroxide particles prepared by the method described above as a filler with a thermoplastic or thermoset material can further comprise one or more of lubricants, stabilizers, antioxidants, plasticizers, pigments, dyes, anti-blocking agents, antistatic agents, flame retardants, impact modifiers, coupling agents, wetting agents, processing aids or fibrous reinforcing agents.

While the present invention has been described with reference to particular examples it is to be understood that the invention is not limited to the disclosed examples. To the contrary the invention is intended to cover various modifications and equivalent arrangements as would be known to a person of skill in the art in view of the description. The scope of the claims should not be limited by the embodiments as set forth in the examples but should be given the broadest interpretation consistent with the description as a whole.

All publications, patents and patent applications referred to in the specification are herein incorporated by reference as if each individual publication, patent or patent application was specifically and individually indicated to be incorporated by reference in its entirety.

What is claimed is:

1. A method of preparing calcium carbonate ($CaCO_3$) coated calcium hydroxide ($Ca(OH)_2$) particles comprising:
    introducing calcium hydroxide particles into a reaction vessel;
    reacting the calcium hydroxide particles with carbon dioxide in a form of dry ice by introducing the dry ice into the reaction vessel and allowing the carbon dioxide to co-mingle with the calcium hydroxide particles and react to form a calcium carbonate coating on the calcium hydroxide particles;
    wherein a proportion of the calcium hydroxide particles to dry ice is controlled to provide calcium carbonate coated calcium hydroxide particles comprising 70-80% w/w calcium hydroxide and 5-30% w/w calcium carbonate surface coating.

2. The method according to claim 1 wherein the co-mingling of the calcium hydroxide particles with the carbon dioxide is by gravity settling of the particles.

3. The method according to claim 1 wherein the calcium hydroxide particles are about 44 microns and are in a form of a powder.

4. The method according to claim 1 wherein the proportion of the dry ice to calcium hydroxide is 70 lb of dry ice per ton of calcium hydroxide.

5. The method according to claim 1 wherein the calcium carbonate forms an even coating on a surface of the calcium hydroxide.

6. The method according to claim 1 wherein the calcium carbonate coated calcium hydroxide particles comprise 15-30% w/w calcium carbonate coating.

7. The method according to claim 1 wherein the calcium carbonate coated calcium hydroxide particles comprise 20% w/w calcium carbonate coating.

8. The method according to claim 1 wherein the dry ice is in a form of flakes having an approximate particles size range of minus 12 mesh to plus 18 mesh.

9. The method according to claim 1 wherein the reaction is carried out in batches.

10. The method according to claim 1 wherein the reaction is carried out in a continuous flow.

11. The method of claim 1 wherein the calcium hydroxide particles have a mean particle size of 44 microns and have a size distribution consisting of a 95% population of 44 micron particles.

12. An apparatus for preparing calcium carbonate coated calcium hydroxide particles comprising:
    a reactor;
    an inlet for calcium hydroxide particles;
    an inlet for dry ice; and
    a density meter for determining a specific gravity of a reaction product,
    wherein the specific gravity of the reaction product provides an indication of the percentage of surface carbonation formed by a reaction of the dry ice and calcium hydroxide;
    whereby an amount of dry ice introduced into the apparatus can be increased or decreased to provide a product having a selected specific gravity and percentage of surface carbonation.

13. The apparatus of claim 12 wherein the density meter is in communication with a computer which controls the inlet for the calcium hydroxide particles and the inlet for dry ice to provide a ratio of calcium hydroxide to dry ice in the reactor to provide the product having the selected specific gravity.

14. The apparatus of claim 12 further comprising an outlet for removal of the calcium carbonate coated calcium hydroxide particles.

15. The apparatus of claim 12 wherein the calcium hydroxide and dry ice can be added to the reactor simultaneously to allow for gravity mixing of reaction components.

16. A composition comprising carbonate coated calcium hydroxide particles having about 70-80% w/w calcium hydroxide and about 5-30% w/w calcium carbonate surface coating; the calcium carbonate forming an even coating on the calcium hydroxide.

17. A method of using the composition as described in claim 16 as a filler, the method comprising the step of mixing the composition with a polymer.

18. The method of claim 17 wherein the polymer is a thermoplastic or a thermoset.

19. A method of preparing calcium carbonate ($CaCO_3$) coated calcium hydroxide ($Ca(OH)_2$) particles comprising:
    introducing calcium hydroxide particles into a reaction vessel;
    reacting the calcium hydroxide particles with carbon dioxide in a form of dry ice by introducing the dry ice into the reaction vessel and allowing the carbon dioxide to co-mingle with the calcium hydroxide particles and react to form a calcium carbonate coating on the calcium hydroxide particles;
    wherein a proportion of the calcium hydroxide particles to dry ice is controlled to provide calcium carbonate coated calcium hydroxide particles comprising 70-95% w/w calcium hydroxide and 5-30% w/w calcium carbonate surface coating.

20. The method of claim 19 wherein the calcium hydroxide particles are less than 75 microns.

21. A composition comprising carbonate coated calcium hydroxide particles having about 70-95% w/w calcium hydroxide and about 5-30% w/w calcium carbonate surface coating; the calcium carbonate forming an even coating on the calcium hydroxide.

22. The composition of claim 21 wherein the calcium hydroxide particles are less than 75 microns.

* * * * *